US012217616B2

(12) United States Patent
Faizan et al.

(10) Patent No.: US 12,217,616 B2
(45) Date of Patent: Feb. 4, 2025

(54) AIRCRAFT TRACKING SYSTEM AND METHOD

(71) Applicant: Mirza Faizan, Irving, TX (US)

(72) Inventors: Mirza Faizan, Irving, TX (US); Mirza Rizwan, Patna (IN); Danish Khan, Murphy, TX (US); Sidra Ambreen, Plano, TX (US); Mustafa Syed, Murphy, TX (US); Yaseen Syed, Murphy, TX (US); Mehreen Syed, Murphy, TX (US); Vineet Anshuman, Sunnyvale, CA (US); Aiman Rahman, Murphy, TX (US); Summan Rahman, Murphy, TX (US); Saadia Asaf, Aligarh (IN); Mansoor Hasan Khan, Aligarh (IN)

( * ) Notice: Subject to any disclaimer, the term of this patent is extended or adjusted under 35 U.S.C. 154(b) by 817 days.

(21) Appl. No.: 17/339,280

(22) Filed: Jun. 4, 2021

(65) Prior Publication Data

US 2022/0390615 A1 Dec. 8, 2022

(51) Int. Cl.
*G08G 5/00* (2006.01)

(52) U.S. Cl.
CPC .................................. *G08G 5/0082* (2013.01)

(58) Field of Classification Search
CPC ...... G01S 13/91; G01S 2205/001–003; G08G 5/0004; G08G 5/0013; G08G 5/0017; G08G 5/0026; G08G 5/0073
See application file for complete search history.

(56) References Cited

U.S. PATENT DOCUMENTS

| | | | | |
|---|---|---|---|---|
| 11,821,979 | B2 * | 11/2023 | Chan | G01S 13/003 |
| 2015/0346726 | A1 * | 12/2015 | Davoodi | B63B 22/20 440/38 |
| 2016/0313467 | A1 * | 10/2016 | Davoodi | H04Q 9/00 |
| 2019/0028197 | A1 * | 1/2019 | Turner | H04B 7/195 |
| 2021/0274315 | A1 * | 9/2021 | Daoura | H04W 4/38 |

* cited by examiner

*Primary Examiner* — Christian Chace
*Assistant Examiner* — Katherine Marie Fitzharris

(57) ABSTRACT

The present invention discloses a receiver and transmitter of enroute aircraft data (RATEAD) system and method of tracking missing aircraft by the system. The system comprising: a plurality of network enabled devices at a plurality of locations; and said plurality of network enabled devices are communicatively coupled to an aircraft passing within a pre-defined range, wherein a data of said in range aircraft is communicatively transmitted in real-time to a network device of said plurality of network enabled devices with which said aircraft is connected.

6 Claims, 4 Drawing Sheets

AIRCRAFT TRACKING SYSTEM AND METHOD

FIELD OF THE INVENTION

The present invention generally relates to aircraft tracking system and method. More specifically the present invention relates to receiver and transmitter of enroute aircraft data (RATEAD) system.

BACKGROUND OF THE INVENTION

It is a substantially growing challenge of locating the black box of an aircraft in the event of an incident or a crash. In fact in 2017 alone, there were one hundred eleven crashes worldwide. However, the most pertinent problem lies in the hundreds millions of dollars invested in search of the black box. Additionally, it may take accident investigators and agencies months or even years of active searching to locate the black box that holds data imperative to solving the case.

However in some cases, such as a relatively recent site involving Malaysian Airlines, flight MH370, neither the aircraft nor the black box was ever located even after spending over $100 million in search operations, leaving this case a mystery. Another example of this rising problem, is Air France flight AF447, flying from Rio de Janeiro to Paris. In this case, it took nearly 2 years to discover the black box in addition to spending around $100 million.

Hence there is an utmost need to identify a system by which the black box data of flights may be secured and a quick identification of a crashed plane may take place. The present disclosed method solves this mentioned problem.

SUMMARY OF THE INVENTION

The present invention relates to receiver and transmitter of enroute aircraft data (RATEAD) system, said system comprising a plurality of network enabled devices at a plurality of locations; and said plurality of network enabled devices are communicatively coupled to an aircraft passing within a pre-defined range, wherein a data of said in range aircraft is communicatively transmitted in real-time to a network device of said plurality of network enabled devices with which said aircraft is connected.

In addition to one or more of the features of the RATEAD system described above, wherein a receiver and a transmitter of enroute aircraft data system is located on a plurality of floating buoys.

In addition to one or more of the features of the RATEAD system described above, wherein the receiver and transmitter of the enroute aircraft data system is located on a plurality of balloon shaped units.

The RATEAD system as described above, further comprises a receiver unit enabled to receive data transmitted from the aircraft over a high speed laser data transfer system.

The RATEAD system as described above, further comprises a GPS tracking system.

In addition to one or more of the features of the RATEAD system described above, wherein the GPS system is configured to track position of said floating buoys and said balloon shaped units.

In addition to one or more of the features of the RATEAD system described above, wherein the floating buoys comprises solar-powered motors to return back to the correct location.

In addition to one or more of the features of the RATEAD system described above, wherein the balloon shaped units comprise solar-powered motors to return back to the correct location.

The RATEAD system as described above, further comprises an alarming feature, wherein said alarming feature generates alarm in an instance of disconnection from a connected aircraft.

The RATEAD system as described above, further comprises a memory to store real time location of all connected aircrafts.

The present invention relates to a method to track an aircraft by said receiver and transmitter of enroute aircraft data (RATEAD) system. The method comprising transmitting a query to each of said connected RATEAD systems; wherein said query includes unique codes of missing aircraft; and in response to said query, said RATEAD system communicatively transmits data from all connected RATEAD systems in route of said missing aircraft; wherein said query is completed when a data from said transmitted data is missing from a RATEAD system which was in route of said missing aircraft.

Objects of the Invention

An object of the present invention is to provide receiver and transmitter of enroute aircraft data (RATEAD) system.

Yet another object of the invention is to provide a system comprising a plurality of network enabled devices at a plurality of locations; and said plurality of network enabled devices are communicatively coupled to an aircraft passing within a pre-defined range, wherein a data of said in range aircraft is communicatively transmitted in real-time to a network device of said plurality of network enabled devices with which said aircraft is connected.

Yet another object of the invention is to provide real time tracking of enroute aircrafts.

Yet another object of the invention is to provide a receiver and transmitter of enroute aircraft data system located on a solar powered balloon shaped unit.

Yet another object of the invention is to provide real time replica of black box data.

Yet another object of the invention is to provide a GPS tracking system based crashed aircraft identification.

Yet another object of the invention is to provide a tracking tools which may be self powered and auto controlled in water and sky.

Yet another object of the invention is to provide a method to track an aircraft by the receiver and transmitter of enroute aircraft data (RATEAD) system.

SHORT DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION OF DRAWINGS

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment," "an embodiment," "at least one embodiment," "one example," "an example," "for example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Figure 1:
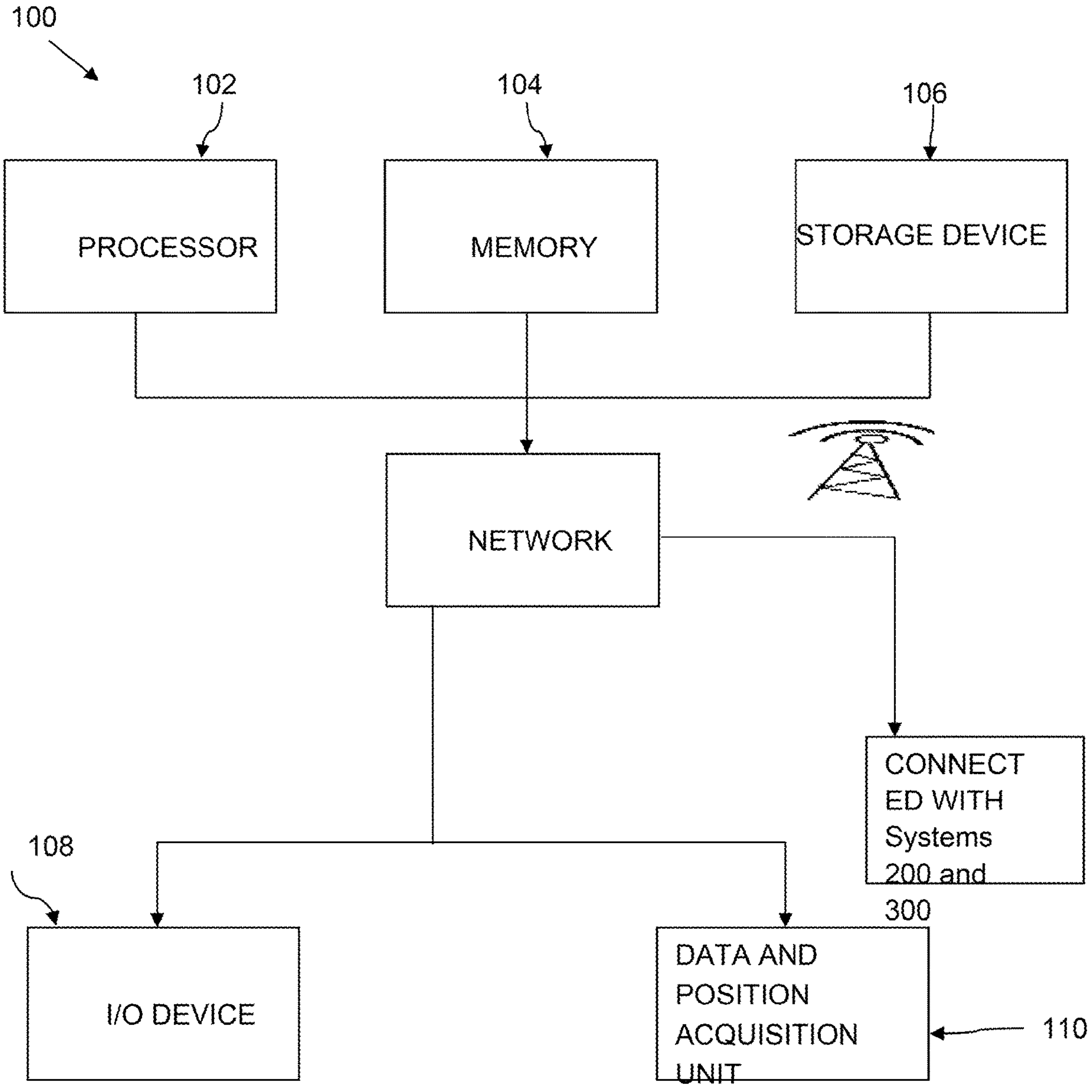
FIG. 1 illustrates a general system diagram with which RATEAD system is wirelessly connected in accordance with an embodiment of the present invention.

FIG. 1 illustrates a system diagram with which RATEAD system is wirelessly connected in in accordance with an embodiment of the present invention.

FIG. 1 shows an example of a computing device 100 that can be used to implement the techniques described here. Computing device 100 is intended to represent various forms of digital computers, such as laptops, desktops, workstations, personal digital assistants, servers, blade servers, mainframes, and other appropriate computers. Computing device 100 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 100 includes a processor 102, memory 104, a storage device 106, a high-speed interface connecting to memory and high-speed expansion ports, a low speed interface connecting to low speed bus and storage device 106, an I/O device 108, and a data and position acquisition unit 110. Each of the components 102, 104, 106, 108, and 110 are interconnected using various busses, and may be mounted on a common motherboard or in other manners as appropriate. The processor 102 can process instructions for execution within the computing device 100, including instructions stored in the memory 104 or on the storage device 106 to display graphical information for a GUI on an external input/output device, such as display coupled to high speed interface. In other implementations, multiple processors and/or multiple busses may be used, as appropriate, along with multiple memories and types of memory.

Processor 102 may communicate with a user through control interface and display interface coupled to a display. The display may be, for example, a TFT LCD (Thin-Film-Transistor Liquid Crystal Display) or an OLED (Organic Light Emitting Diode) display, or other appropriate display technology. The display interface may comprise appropriate circuitry for driving the display to present graphical and other information to a user, such as information related to the enroute aircraft. The control interface may receive commands from a user and convert them for submission to the processor 102. In addition, an external interface may be provided in communication with processor 102, so as to enable near area communication of device 100 with other devices. External interface may provide, for example, for wired communication in some implementations, or for wireless communication in other implementations, and multiple interfaces may also be used.

The computing device 100 is shown as including a memory 104. The memory 104 may store executable instructions. The executable instructions may be stored or organized in any manner and at any level of abstraction, such as in connection with one or more applications, processes, routines, procedures, methods, functions, etc.

In one implementation, the memory 104 is a volatile memory unit or units. In another implementation, the memory 104 is a non-volatile memory unit or units. The memory 104 may also be another form of computer-readable medium, such as a magnetic or optical disk. In one implementation, a computer program product is tangibly embodied in an information carrier. The computer program product contains instructions that, when executed, perform one or more methods, such as those described above. The information carrier is a computer- or machine-readable medium, such as the memory, expansion memory, or memory on processor. In an embodiment the memory may contain the data pertaining to each aircraft that may have communicated with the device of the present system.

Expansion memory may also be provided and connected to device 100 through expansion interface, which may include, for example, a SIMM (Single In Line Memory Module) card interface. Such expansion memory may provide extra storage space for device 100, or may also store applications or other information for device 100. Specifically, expansion memory may include instructions to carry out or supplement the processes described above, and may include secure information also. Thus, for example, expansion memory may be provided as a security module for device 100, and may be programmed with instructions that permit secure use of device 100. In addition, secure applications may be provided via the SIMM cards, along with additional information, such as placing identifying information on the SIMM card in a non-hackable manner.

The instructions stored in the memory 104 may be executed by one or more processors, such as a processor 102. The processor 102 may be coupled to one or more input/output (I/O) devices 108.

The storage device 106 is capable of providing mass storage for the computing device 100. In one implementation, the storage device 106 may be or contain a computer-readable medium, such as a floppy disk device, a hard disk device, an optical disk device, a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 104, the storage device 106, or memory on processor 102.

In some embodiments, the I/O device(s) 108 may include one or more of a keyboard or keypad, a touchscreen or touch panel, a display screen, a microphone, a speaker, a mouse, a button, a remote control, a joystick, a printer, a telephone or mobile device (e.g., a smartphone), a sensor, etc. The I/O device(s) 108 may be configured to provide an interface to allow a user to interact with the computing device or system 100.

The high-speed controller manages bandwidth-intensive operations for the computing device 100, while the low speed controller manages lower bandwidth-intensive operations. Such allocation of functions is exemplary only. In one implementation, the high-speed controller is coupled to memory 104, display (e.g., through a graphics processor or accelerator), and to high-speed expansion ports, which may accept various expansion cards (not shown). In the implementation, low-speed controller is coupled to storage device 106 and low-speed expansion port. The low-speed expansion port, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The memory 104 may store data. The data may include data provided by one or more sensors over the wireless network. The data may be processed by the processor 102 to control one or more parameters associated with the aircraft.

The computing device 100 may communicate wirelessly through communication interface, which may include digital signal processing circuitry where necessary. Communication interface may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver. In addition, short-range communication may occur, such as using a Bluetooth, Wi-Fi, or other such transceiver (not shown). In addition, GPS (Global Positioning System) receiver module may provide additional navigation- and location-related wireless data to device 100, which may be used as appropriate by applications running on device 100.

The data and position acquisition unit 110 may be configured to analyze real time data of the communicatively attached aircraft from each of the RATEAD system. The data and position acquisition unit 110 may also be configured to determine the actual speed, variations and other critical information from the aircraft.

Further the aircraft may be connected to the RATEAD system. The aircraft may be communicatively coupled to either of disclosed embodiment 200 (having plurality of buoys) or 300 (having plurality of balloons) and the computing device 100.

Figure 2:
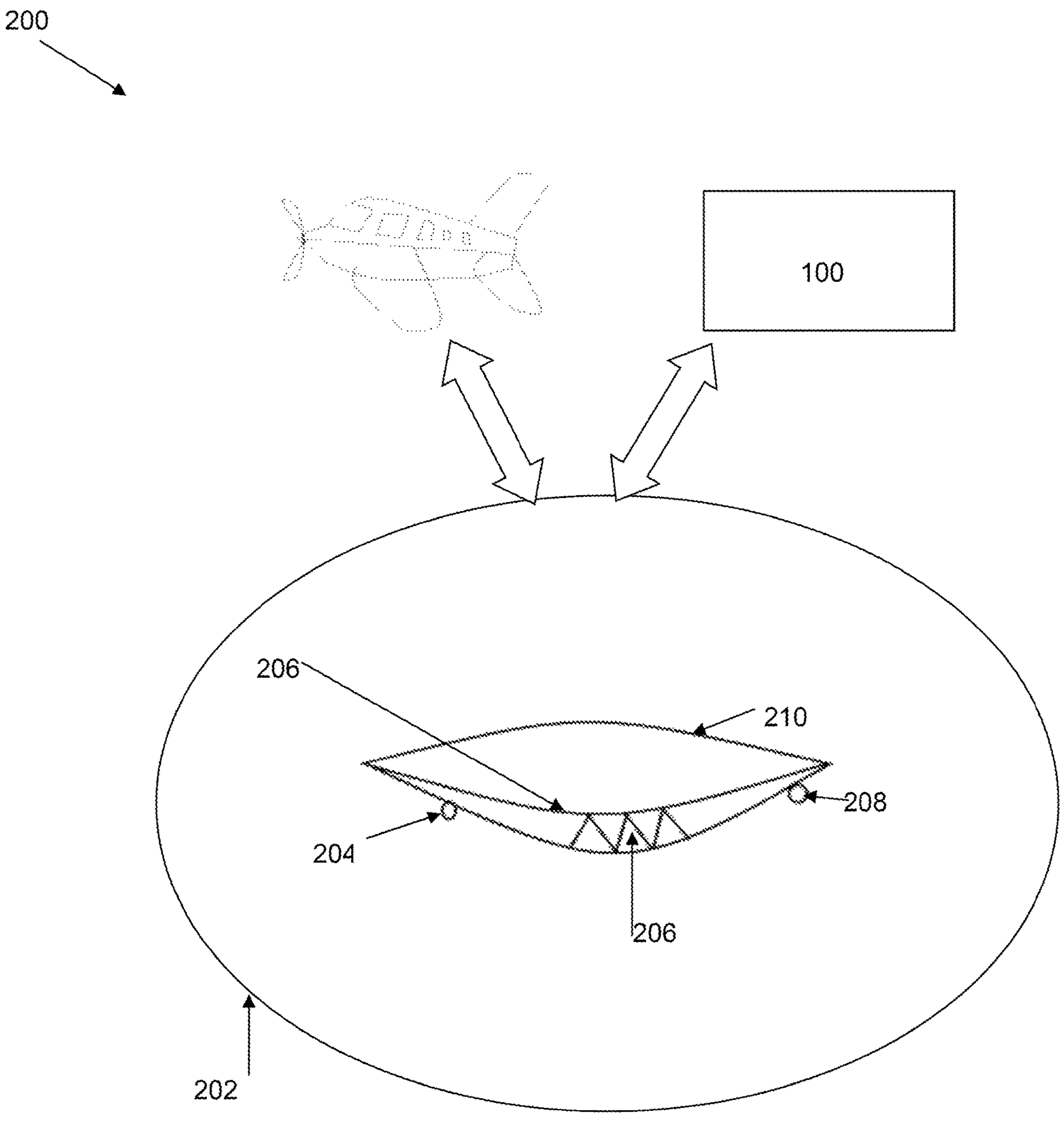
FIG. 2 illustrates a RATEAD system in accordance with an embodiment of the present invention.

FIG. 2 illustrates a RATEAD system in accordance with an embodiment of the present invention.

The RATEAD system 200 as disclosed is communicatively coupled to 100 as disclosed. The RATEAD system 200 may comprise a plurality of floating buoys 202, a solar powered battery system 204, a plurality of network enabled elements 206 such as gyroscope mounted and movable receiver dish antenna, one or more motors 208 and a solar panel and weatherproof system 210.

The floating buoys 202 may correspond to floating devices in water bodies. The floating buoys 202 may include plurality of sensors. The plurality of sensors may correspond to a climate identification sensor, a tide variation determination sensor and alike. The floating buoys may be GPS enabled and tagging based buoys, so that in a situation when due to water currents, they are displaced from their actual position, then the system may gets notification of such change and the same can be repositioned to the actual position by moving the buoys.

The solar powered battery system 204 may be utilized for empowering the floating buoys 202. The battery may be lithium ion battery and may be in plurality, connected in series, so that the power may be stored in all the batteries. The batteries may get charge up by the solar panel 210 of the system. The solar panel may comprise a cascade of cell based network interconnected with each other, and furthermore, the status of the solar plates and the batteries may be communicated in real time to the computing device 100.

The plurality of network enabled elements 206 such as gyroscope mounted and movable receiver dish antenna, in the RATEAD may be configured to enable communication from the RATEAD to the airplane and vice versa. Also, the antenna may enable the system to communicate with the computing device 100 in real time basis. Hence, the information may be transmitted in almost real time and no data is lost. The gyroscope enables the antenna to align in the direction of aircraft. Henceforth, the RATEAD device may always be aligned towards the moving aircraft.

The one or more motors 208 may be configured to anchor the antenna of the system in a smooth fashion. The motors may be solar powered run motors and may auto start and stop function enabled motors. When the RATEAD device identifies that the airplane is within the network boundary, then this motor synchronizes the antenna with the direction of the airplane and henceforth the continuous uninterrupted communication may be established.

The solar panel and weatherproof system 210 may enabled the entire RATEAD device to remain activated. Furthermore, as the buoys is in water body, so the weatherproof system may protect the device from the abnormal climatic conditions.

In an embodiment of the present invention, RATEAD device may enter into sleep mode and reduce the consumption from all the charged batteries. This enables the system to run for a longer period of time. The system may only enter into sleep mode when it is pre determined that at that particular instance no aircraft may be scheduled to pass the network area of the RATEAD device. Alternatively, in high frequency areas, the device may not at all go into sleep mode.

Figure 3:
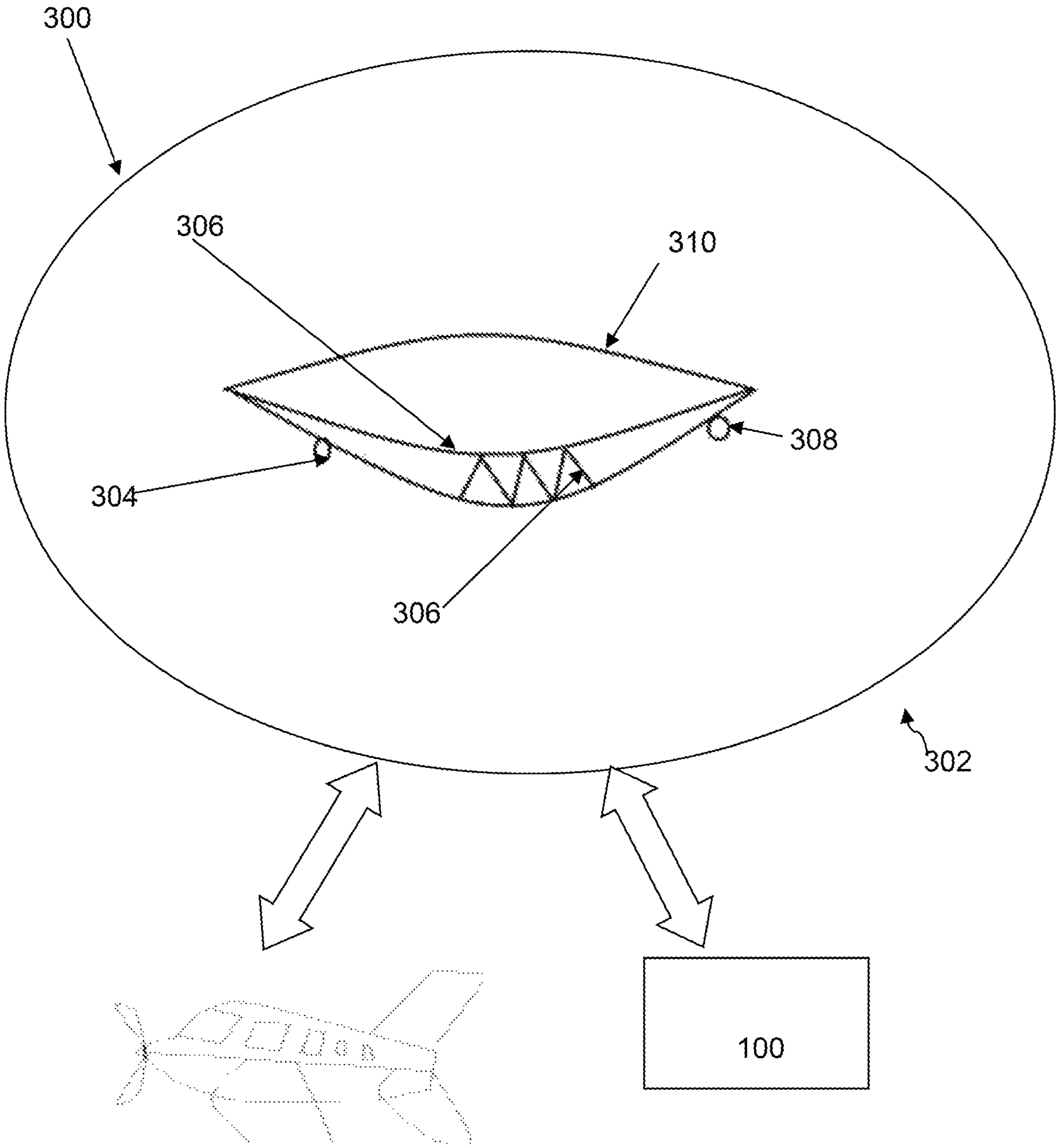
FIG. 3 illustrates a RATEAD system in accordance with another embodiment of the present invention.

FIG. 3 illustrates a RATEAD system in accordance with another embodiment of the present invention.

The RATEAD system 300 as disclosed is communicatively coupled to 100 as disclosed. The RATEAD system 300 may comprise a plurality of balloons 302, a solar powered battery system 304, a plurality of network enabled elements 306 such as gyroscope mounted and movable receiver dish antenna, one or more motors 308 and a solar panel and weatherproof system 310.

The plurality of balloons 302 may correspond to floating devices in air, in a specific layer. The plurality of balloons 302 may include plurality of sensors. The plurality of sensors may correspond to a climate identification sensor, an air variation determination sensor and alike.

The solar powered battery system 304 may be utilized for empowering the plurality of balloons 302. The battery may be lithium ion battery and may be in plurality, connected in series, so that the power may be stored in all the batteries. The batteries may get charge up by the solar panel 310 of the system. The solar panel may comprise a cascade of cell based network interconnected with each other, and furthermore, the status of the solar plates and the batteries may be communicated in real time to the computing device 100.

The plurality of network enabled elements 306 such as gyroscope mounted and movable receiver dish antenna, in the RATEAD may be configured to enable communication from the RATEAD to the airplane and vice versa. Also, the antenna may enable the system to communicate with the computing device 100 in real time basis. Hence, the information may be transmitted in almost real time and no data is lost. The gyroscope enables the antenna to align in the direction of aircraft. Henceforth, the RATEAD device may always be aligned towards the moving aircraft.

The one or more motors 308 may be configured to anchor the antenna of the system in a smooth fashion. The motors may be solar powered run motors. When the RATEAD device identifies that the airplane is within the network boundary, then this motor synchronizes the antenna with the direction of the airplane and henceforth the continuous uninterrupted communication may be established.

The solar panel and weatherproof system 310 may enabled the entire RATEAD device to remain activated. Furthermore, as the balloons are in the air, so the weatherproof system may protect the device from the abnormal climatic conditions, such as thunderstorms.

In an embodiment of the present invention, RATEAD device may enter into sleep mode and reduce the consumption from all the charged batteries. This enables the system to run for a longer period of time. The system may only enter into sleep mode when it is pre determined that at that particular instance no aircraft may be scheduled to pass the network area of the RATEAD device. Alternatively, in high frequency areas, the device may not at all go into sleep mode.

The method to track an aircraft by said receiver and transmitter of enroute aircraft data (RATEAD) system comprising: transmitting a query to each of the connected RATEAD systems. The query includes unique codes of missing aircraft; in response to the query, the RATEAD system communicatively transmits data from all connected RATEAD systems in route of the missing aircraft; wherein the query is completed when a data from the transmitted data is missing from a RATEAD system which was in route of said missing aircraft.

Figure 4:
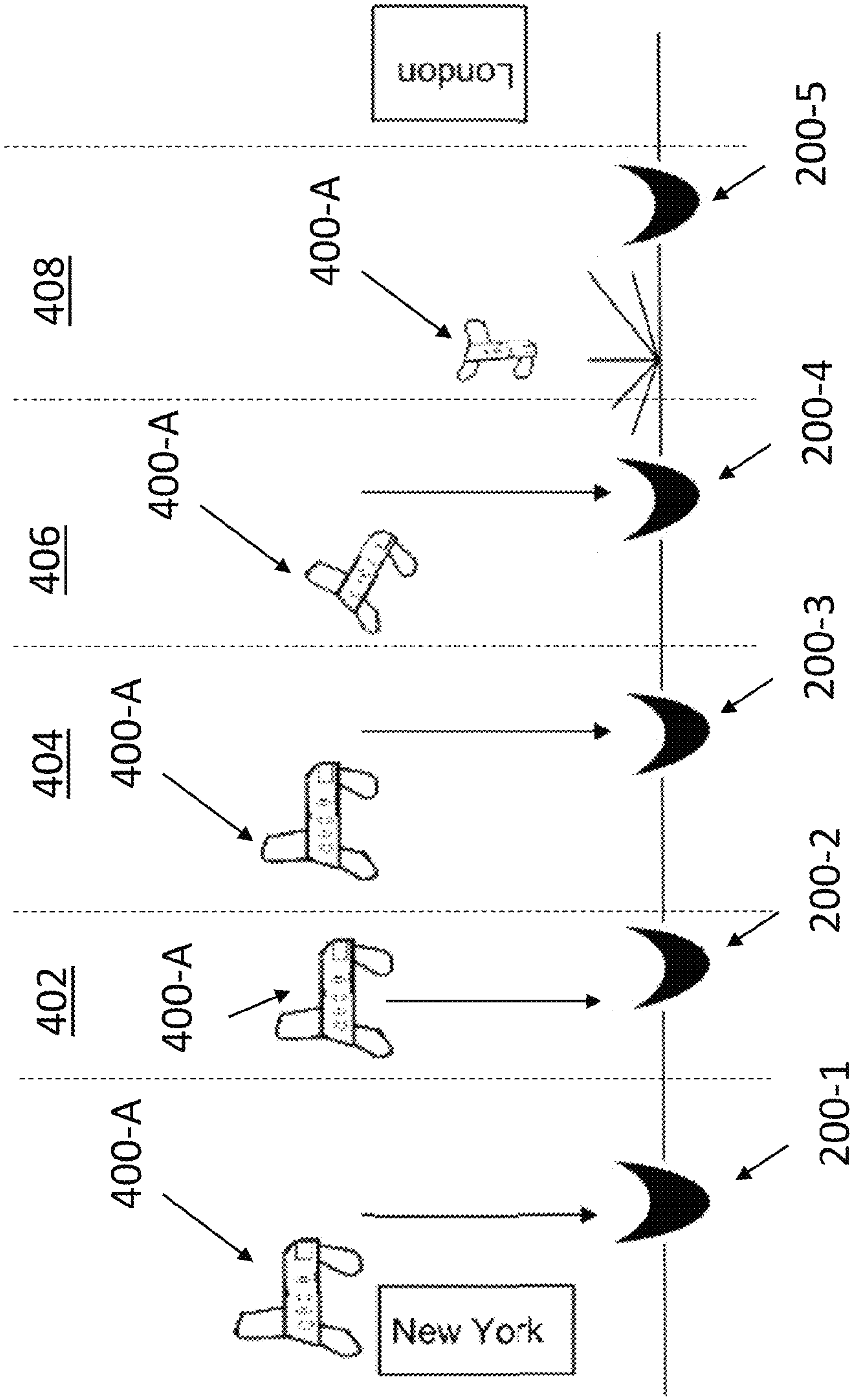
FIG. 4 illustrates an exemplary scenario in accordance with an embodiment of the present invention.

FIG. 4 illustrates an exemplary scenario in accordance with an embodiment of the present invention.

In example an aircraft may be connected to the RATEAD system. The aircraft may be communicatively coupled to either of disclosed embodiment 200 (having plurality of buoys) or 300 (having plurality of balloons) and the computing device 100.

A first buoys out of plurality of buoys determine the presence of the aircraft over its coverage area. The gyroscope attached to the buoys enables the RATEAD system to in direction communicate with the moving aircraft. Furthermore, at this instance, the communication system of the connected buoys with the aircraft may in real time make replica of the data of the black box.

Then, the same aircraft crosses the network boundary of the connected buoys/balloon and gets in connection with the other buoys/balloon, and now is connected with the other buoys/balloon in real time basis. This information may be further communicated to the computing device 100 for real time analysis of the transmitted data.

Thereafter, the same aircraft moves ahead and gets disappeared. At this instance, the buoys/balloon by which the aircraft that was supposed to be connected determines that the aircraft did not came in the network coverage area within the predetermined time frame, and at this instance the communication system, communicates this particular data to the computing device 100. The computing device 100 may after other determinations and computations generates an alarm about the missing of the aircraft and alerts the agencies in minimum time frame.

In example method, at 402, an aircraft 400-A may be connected to the RATEAD system. The aircraft 400-A may be communicatively coupled to either of disclosed embodiment 200 (having plurality of buoys) or 300 (having plurality of balloons) and the computing device 100.

At 404, a buoy 200-3 out of plurality of buoys determine the presence of the aircraft over its coverage area. The gyroscope attached to the buoys enables the RATEAD system to in direction communicate with the moving aircraft. Furthermore, at this instance, the communication system of the connected buoy 200-3 with the aircraft 400-A may in real time make replica of the data of the black box.

At 406, the same aircraft 400-A crosses the network boundary of the connected buoy 200-3 and gets in connection with the other buoy 200-4, and now is connected with the other buoy 200-4 in real time basis. This information may be further communicated to the computing device 100 for real time analysis of the transmitted data.

At 408, the same aircraft 400-A, moves ahead and gets disappeared. At this instance, the buoys by which the aircraft 400-A that was supposed to be connected determines that the aircraft did not come in the network coverage area within the predetermined time frame, and at this instance the communication system communicates this particular data to the computing device 100. The computing device 100 may after other determinations and computations generates an alarm about the missing of the aircraft 400-A and alerts the agencies in minimum time frame.

It is noted that various connections are set forth between elements in the description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Various embodiments of the invention have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms “comprises” and “comprising” should be interpreted as referring to elements, components, or steps, in a non-exclusive manner, indicating that the referenced elements, components, or steps may be present, or utilized, or combined with other elements, components, or steps that are not expressly referenced.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, "C," "C++," "Visual C++," Java, and "Visual Basic." Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, "Unix," "DOS," "Android," "Symbian," and "Linux."

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The claims can encompass embodiments for hardware, software, or a combination thereof.

Although a few implementations have been described in detail above, other modifications are possible. Moreover, other mechanisms for performing the systems and methods described in this document may be used. In addition, the logic flows depicted in the figures may not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A receiver and transmitter of enroute aircraft data (RATEAD) system, said system comprising:

a computing device;

a plurality of buoys at a plurality of locations; and a plurality of network enabled devices, wherein each network enabled device of said plurality of network enabled devices is integrated with a corresponding buoy of said plurality of buoys, a first buoy of said plurality of buoys is configured to determine presence of an aircraft within a coverage area of said first buoy, said aircraft flies along a route from a source station to a destination station, a first network enabled device of said plurality of network enabled devices is integrated with said first buoy, said first network enabled device is configured to communicatively couple with said aircraft based on said determined presence of said aircraft within said coverage area of said first buoy, data of said aircraft is communicatively transmitted in real-time to said first network enabled device, said aircraft is communicatively coupled to said first network enabled device for a first time period, a first memory coupled with said first network enabled device stores said data received from said aircraft during said first time period, after an end of said first time period, said first network enabled device is configured to transmit a unique identifier associated with said aircraft to a second buoy of said plurality of buoy and said second buoy is configured to determine whether said aircraft is present within a coverage area of said second buoy, said second buoy is next to said first buoy along said route of said aircraft from said source station to said destination station, a second network enabled device of said plurality of network enabled devices is integrated with said second buoy, based on the determination that said aircraft is not present within said coverage area of said second buoy at an expiry of a second time period after said first time period, said second network enabled device is configured to transmit an alarm signal to said computing device, and based on said alarm signal, said computing device is configured to:

generate an alarm that indicates missing of said aircraft from said route, transmit a query signal to each of said plurality of network enabled devices in said route of said aircraft, wherein said query signal includes said unique identifier of said missing aircraft, and receive, from said first network enabled device, said data of said missing aircraft stored in said first memory during the first time period before the missing of said aircraft from said route.

2. The receiver and transmitter of enroute aircraft data (RATEAD) system as claimed in claim 1, further comprising a receiver unit enabled to receive data transmitted from the aircraft over a high speed laser data transfer system.

3. The receiver and transmitter of enroute aircraft data (RATEAD) system as claimed in claim 1, further comprising a GPS tracking system.

4. The receiver and transmitter of enroute aircraft data (RATEAD) system as claimed in claim 3, wherein said GPS system is configured to track position of said plurality of buoys.

5. The receiver and transmitter of enroute aircraft data (RATEAD) system as claimed in claim 4, wherein each of said plurality of buoys comprises solar-powered motors to move a corresponding buoy to a specific location.

6. The receiver and transmitter of enroute aircraft data (RATEAD) system as claimed in claim 1, further comprising a second memory to store real time location of all connected aircrafts.

* * * * *